United States Patent [19]
Riley

[11] 3,911,301
[45] Oct. 7, 1975

[54] DUAL PULSE TRAIN GENERATING APPARATUS UTILIZING ONLY ONE MAGNETIC SENSOR

[75] Inventor: Arthur F. Riley, Chicago, Ill.
[73] Assignee: Teletype Corporation, Skokie, Ill.
[22] Filed: Dec. 12, 1973
[21] Appl. No.: 423,950

[52] U.S. Cl. .................. 310/111; 310/168; 310/114
[51] Int. Cl.² ........................................ H02K 39/00
[58] Field of Search .......................... 310/190–193, 310/209, 168, 111, 112, 114, 126; 340/347 P, 357

[56] References Cited
UNITED STATES PATENTS

| | | | |
|---|---|---|---|
| 2,758,227 | 8/1956 | Reymoneng et al. | 310/168 X |
| 3,562,741 | 2/1971 | McEvoy et al. | 310/111 X |
| 3,572,106 | 3/1971 | Jonas | 310/168 X |
| 3,688,306 | 8/1972 | Oishi et al. | 340/347 P |
| 3,713,015 | 1/1973 | Frister | 322/51 |

Primary Examiner—Donovan F. Duggan
Attorney, Agent, or Firm—K. R. Bergum; W. K. Serp; J. L. Landis

[57] ABSTRACT

A dual pulse train generating apparatus utilizes a single magnetic sensor and a drive shaft-driven code wheel which has a plurality of equally spaced, notch-like protuberances of ferromagnetic material formed about the periphery thereof. One protuberance is constructed, in part, with an operably displaceable segment. All of the protuberances, including the segmented one, are specially contoured such that when they are successively moved through a magnetic sensor-established magnetic field, they each effect a time-rate-of-change therein in a manner that results in the sensor generating a sharp, normal output pulse of a given polarity in response to each sensed protuberance.

11 Claims, 9 Drawing Figures

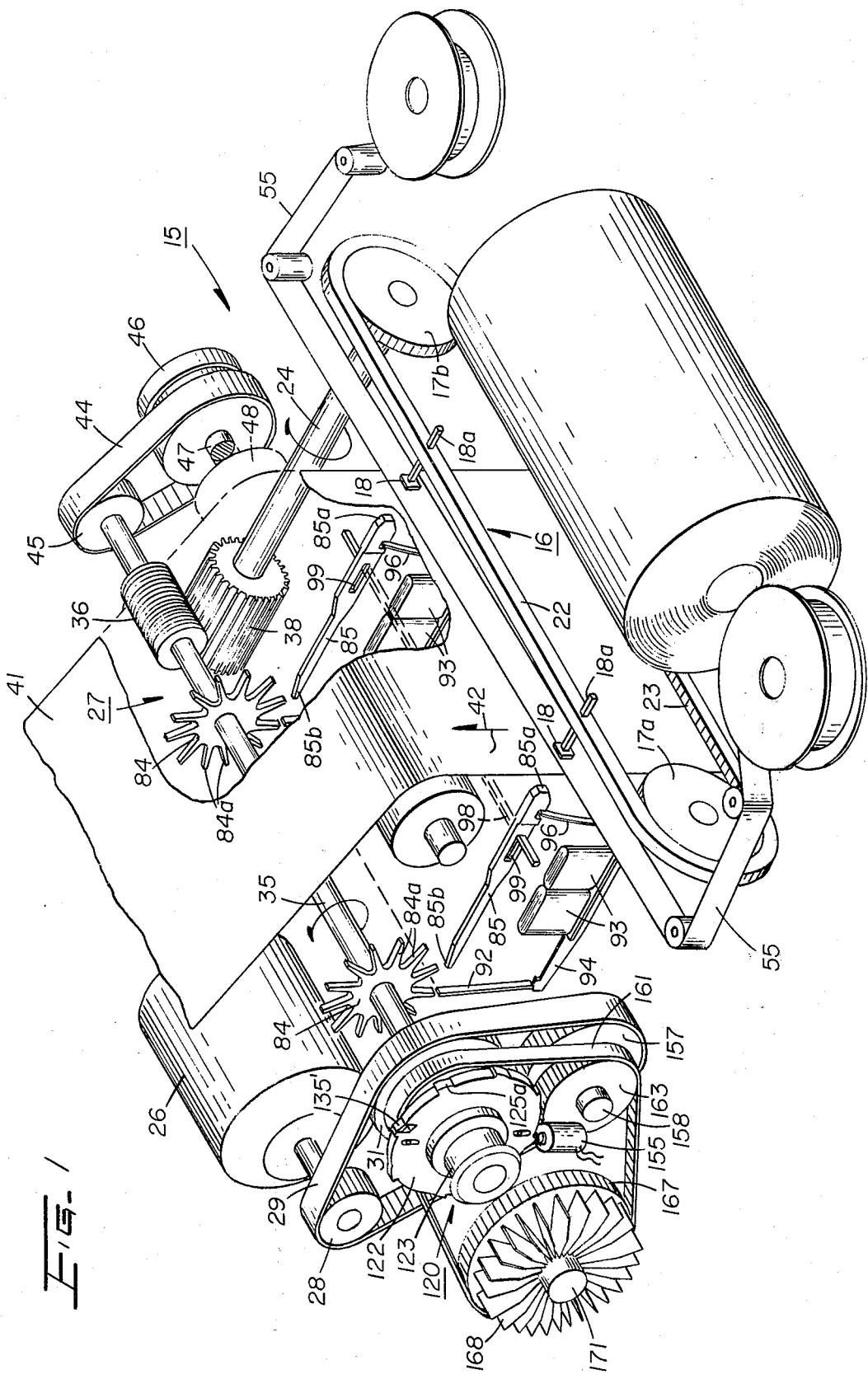

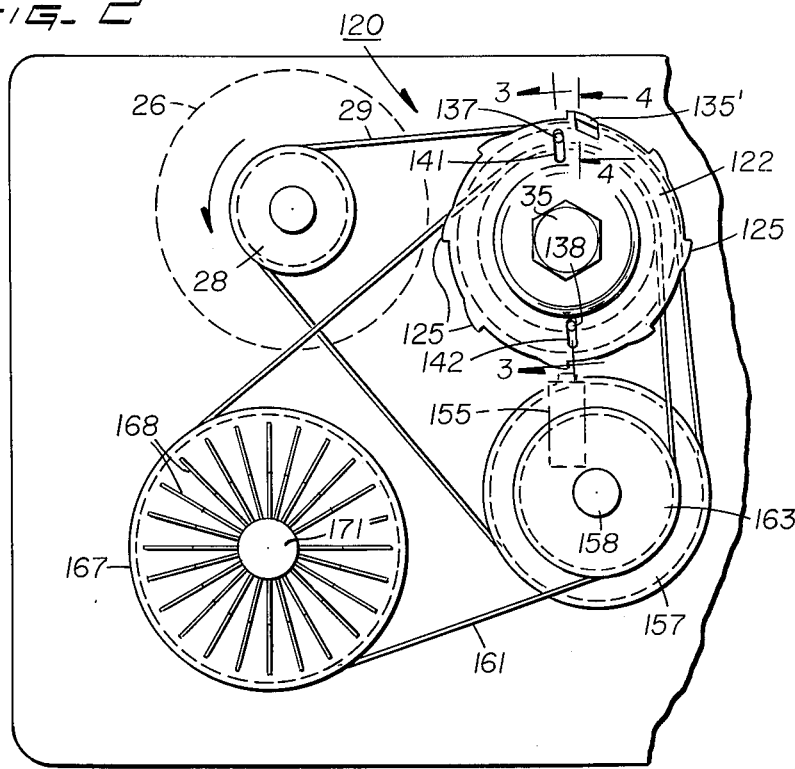
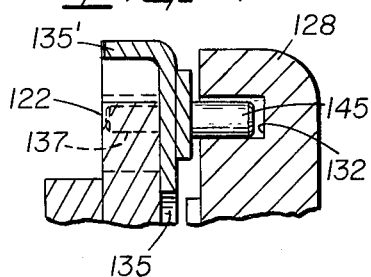
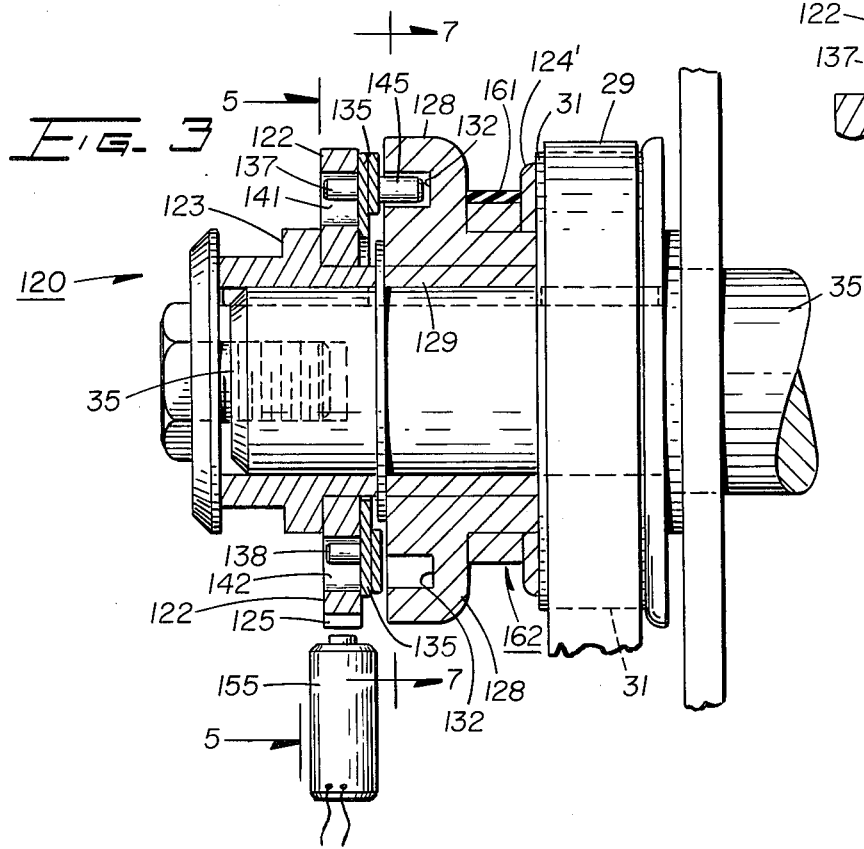

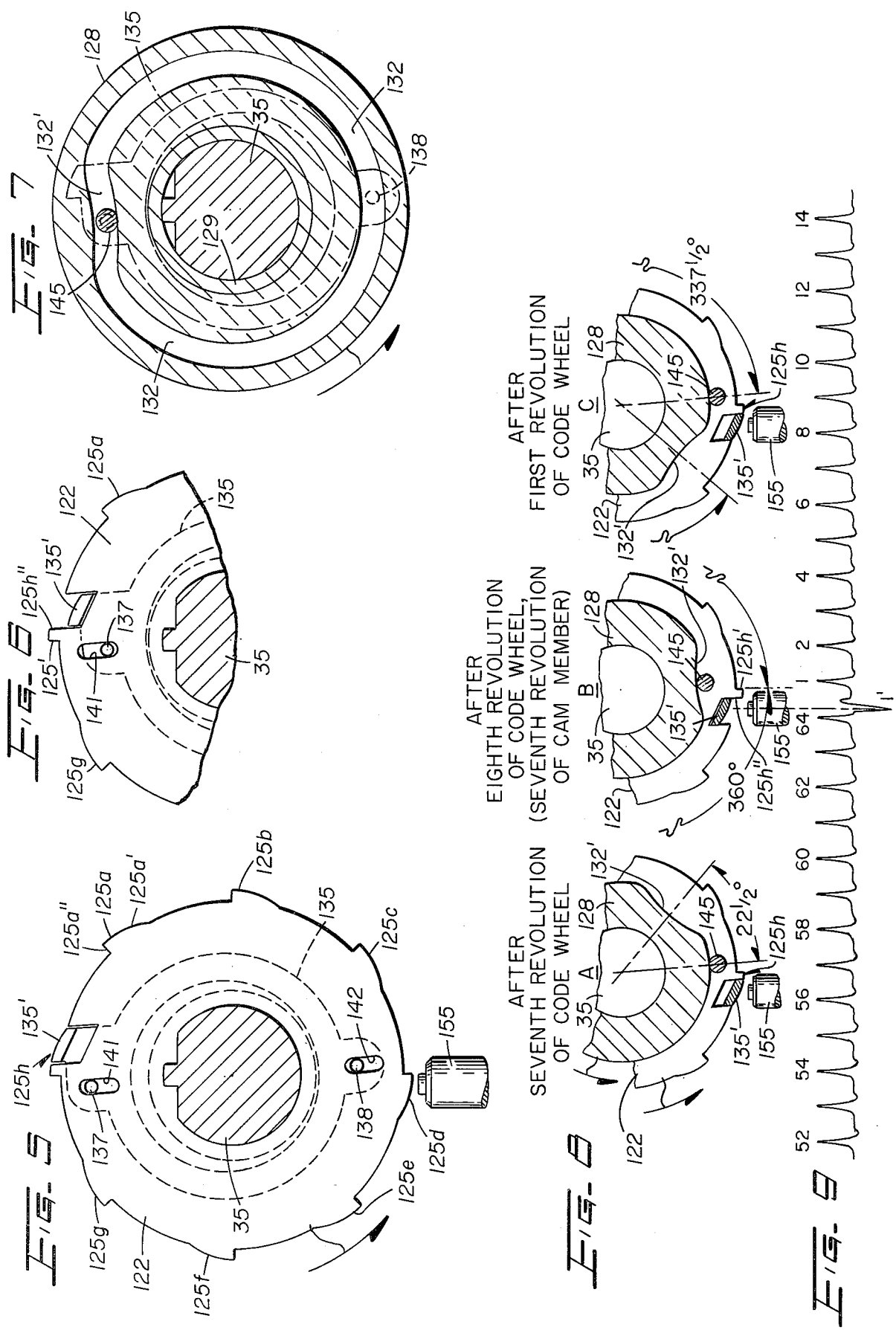

DUAL PULSE TRAIN GENERATING APPARATUS UTILIZING ONLY ONE MAGNETIC SENSOR

BACKGROUND OF THE INVENTION

1. Field of the Invention

This invention relates to pulse-generating apparatus and, more particularly, to differentially driven rotatable apparatus that allows a single magnetic sensor to produce dual output timing pulse trains.

2. Description of the Prior Art

Mechanically driven pulse-generating timing (or measuring) apparatus employed heretofore to sense incremental angular or linear displacement of mechanically driven apparatus has generally included a code wheel or disc and an appropriate code responsive sensor or transducer. The code markings employed to effect the generation of pulses for timing and/or measuring purposes, may comprise, for example, either a circumferentially disposed array of spaced openings, such as slits or apertures in the code wheel or disc, or surface patterns formed thereon, such as of reflective or magnetic material. As used hereinafter, reference to a code wheel is intended to encompass all forms of rotatable members having code patterns formed either therein or thereon.

In connection with magnetic sensing apparatus, the code wheel pattern may be formed of ferromagnetic material, for example, as an integral part of, or otherwise secured to, one or both sides of the wheel and/or about the periphery thereof. In applications where more than one code generated pulse train has been required heretofore, a separate magnetic sensor has normally been required for use with each code pattern.

One particular need for the use of two different, but correlated, pulse trains arises in controlling the time of firing the appropriate print hammers in on-the-fly impact printers. More specifically, very precise timing pulses are required to synchronize logic hammer control circuitry with each instant in time when a continuously moving type carrier, such as a belt, brings a new group of type characters thereon into alignment with a corresponding number of print hammers, the latter being positioned in a spaced, linear array adjacent the type carrier.

Often complicating the timing problem is the fact that in many applications, not every print hammer is aligned with a different type character at the same instant in time. Rather, in many printers the spacing between adjacent type characters on the moving carrier are purposely chosen to be wider than the spacing between adjacent print hammers. This is referred to as a type character-print hammer pitch relationship, the importance of which is to eliminate a so-called "ghosting" problem.

It will suffice to simply state at this point that whenever a pitch relationship exists, a number of sub-scans (type character-print hammer group alignments) are necessarily required in order for every type character to be brought into alignment with every print hammer at some time during a complete print cycle. As the number of sub-scans required increases (which depends upon the pitch relationship chosen), the scanning rate required to ascertain each type character-print hammer group alignment also increases for a given line printing rate. This, of course, also increases the stringent requirements imposed on the accuracy and reliability of the timing pulses generated for that purpose.

Another pulse train is also required in on-the-fly printers to indicate when the first type character of a given font on the continuously moving carrier has passed a given reference point on the printer, such as the first (or last) column, so that the logic process circuitry may be reset to start a new print cycle. For further information about a printer operating with multiple fonts and in a multiple sub-scan mode (based on a pitch relationship existing between type characters and print hammers), and of one preferred hammer control circuit for use therewith, reference is made to U.S. Pat. No. 3,845,710 by D. A. Brodrueck issued Nov. 5, 1974, and entitled "Print Control Logic Circuitry for On-the-fly Printers".

Regardless of the application in which code wheel-driven pulse generating apparatus is employed, whenever two or more timing pulse trains are required, the necessity of a different sensor or transducer (and normally, a separate code wheel) for each pulse train substantially adds both to space requirements and cost of the composite apparatus, particularly when magnetic sensors are employed. While the latter type of sensor is generally more expensive than a photoelectric sensor, the magnetic type is often preferred and, in fact, in many applications actually required where dust, lint, and other types of foreign matter may come in contact with the code wheel and/or sensor and, thereby, possibly impair the generation of accurate and reliable timing pulses. This has been found to be a particularly troublesome problem in mobile impact printers that are often operated under conditions and in environments that are far from ideal in the field. The absence of switch contacts, mechanical or electrical couplers and light sources in magnetic sensor-code wheel pulse generating apparatus, also contributes to its reliable, relatively maintenance free, and long life operation.

There is thus a very definite need for a single code wheel-magnetic sensor combination for generating readily differentiated multiple output pulse trains in a manner that is reliable, accurate, compact and inexpensive.

SUMMARY OF THE INVENTION

It is an object of the present invention to provide a new and improved mechanically driven pulse generating apparatus which employs a single code wheel-magnetic sensor combination to effect the generation of at least two different output pulse trains which are precisely correlated with respect to time, and readily differentiated for utilization.

In accordance with one preferred embodiment of the invention, the pulse generating apparatus includes a single rotatable code wheel adapted for mounting on and rotation with an associated drive shaft. The code wheel has a plurality of ferromagnetic protuberances spaced in a circular array about the axis thereof (preferably on the periphery), with a single magnetic sensor, capable of establishing a magnetic field, positioned adjacent the path of travel of the protuberances. Each protuberance is specially contoured such that when moved through the sensor-established magnetic field, it produces a predetermined time-rate-of change in flux that results in the sensor generating a sharply defined output pulse.

In accordance with the principles of the present invention, at least one of the protuberances is formed, in part, by a selectively displaceable ferromagnetic segment. This segment when displaced, and upon being moved through the sensor-established magnetic field, causes the sensor to generate a pulse in addition to, and distinct from, the normal one effected by the segmented protuberance (as well as by each of the others).

Associated rotatable structural elements are employed to selectively displace the protuberance segment after each successive predetermined number of degrees of angular displacement of the code wheel such that two distinct output pulse trains are generated. In one preferred application in timing the successive alignments of multiple font type characters, transported on a moving belt, with print hammers in an on-the-fly impact printer, two necessary timing pulse trains are not only generated with one magnetic sensor and code wheel at different repetition rates, but preferably with opposite polarities, so as to be readily differentiated.

Such a single code wheel-magnetic sensor pulse generating apparatus is seen to exhibit a number of obvious advantages over prior art multiple code wheel and/or sensor systems in terms of reliability, simplicity, cost and compactness.

BRIEF DESCRIPTION OF THE DRAWINGS

FIG. 1 is a partially broken away perspective view of an illustrative high-speed mobile impact printer, with some parts being omitted for the purpose of illustration, incorporating a unique, mechanically driven dual pulse train generating timing apparatus embodying the principles of the present invention;

FIG. 2 is a partial side elevational view of the main drive mechanism of the illustrative printer and depicts, in particular, the drive shaft and pulleys associated with the mechanically driven portion of the dual pulse train generating apparatus embodied herein;

FIG. 3 is an enlarged, detail view, mainly in cross-section taken along the line 3—3 of FIG. 2, of the mechanically driven portion of the pulse train generating apparatus;

FIG. 4 is an enlarged, fragmentary sectional view taken along the line 4—4 of FIG. 2, of the segment-forming portion of the intermediate member, and of one coupling pin and the cam follower pin secured thereto, relative to the code wheel and cam groove member, respectively;

FIGS. 5 and 6 are enlarged, detail views, partially in section taken along the line 5—5 of FIG. 3, depicting in sequence the relationship between the code wheel and the intermediate segment-defining member associated therewith immediately before and during the displacement of the segment which forms part of one code wheel protuberance;

FIG. 7 is an enlarged cross-sectional view taken along the line 7—7 of FIG. 3, depicting the positional relationship between the code wheel, intermediate segmentdefining member and cam groove member at a point in time which effects displacement of the protuberance segment depicted in FIG. 6;

FIGS. 8A, 8B, and 8C are simplified cross-sectional views, in sequence, illustrating the positions of the protuberance segment immediately before, during and after the cam-action displacement thereof, as effected by the differential rotational movement between the cam follower pin and cam groove member, and FIG. 9 depicts the typical waveform of a positive train of output pulses, and one negative pulse of a second time-related train, generated by a single magnetic sensor associated with the pulse generating apparatus of the present invention, with certain of the generated pulses being correlated time-wise with the different code wheel positions depicted immediately thereabove in FIG. 8.

DETAILED DESCRIPTION OF THE INVENTION

As previously mentioned, the dual pulse train generating apparatus embodied herein has universal application, but for purposes of illustration herein, it is disclosed in connection with producing certain timing pulse trains for use in a high-speed, on-the-fly impact printer of the mobile type depicted in FIG. 1, and identified generally by the reference numeral 15. Such a printer is of the class that utilizes an endless type carrier 16, entrained about a pair of spaced and aligned sprockets or pulleys 17a and 17b, which are journalled by any suitable means on the frame (not shown) of the impact printer. The carrier 16, which may comprise a chain or a toothed timing belt, is adapted to transport a plurality of type pallets 18 (only two shown in FIG. 1) in an essentially orbital path, which is oriented so as to define upper and lower line printing courses in the areas generally identified by the numerals 22 and 23, respectively.

Each of the type pallets 18 has a front face portion having a type character die (not shown) secured thereto or otherwise formed as an integral part thereof. The pallets 18 are uniformly spaced along and oriented transversely of the carrier 16 by means of integral shank portions 18a that extend through suitably formed channels (not shown) formed in the carrier. In a preferred embodiment, there are normally at least twice as many type pallets-characters than in any chosen font. This means that a given sequence of characters is repeated more than once along the entire length of the carrier. For further details as to one preferred embodiment of the carrier 16 and type pallets 18, reference is made to a commonly assigned U.S. Pat. No. 3,742,848 of Huntoon-Kearney, herein incorporated by reference.

In the illustrative embodiment of the printer depicted in FIG. 1, carrier pulleys 17a and 17b constitute idler and drive pulleys respectively. Driving torque is continuously transmitted to the pulleys 17b through a shaft 24 which is coupled to a prime mover, herein shown as a motor 26, through a drive train designated generally by the reference numeral 27 in FIG. 1. The drive train includes a pulley 28 secured to the shaft of the motor 26, and coupled through a drive belt 29 to a pulley 31 (best seen in FIG. 3) which is secured to an elongated drive shaft 35. A worm gear 36, secured to the other end of the drive shaft 35, is enmeshed with a worm gear 38 that, in turn, is secured to the shaft 24. Motor 26 also effects the line feeding or incremental advancement of a web 41, such as paper in roll stock form on which printing is to take place, in the direction shown by arrow 42. This is accomplished in conjunction with a drive train which includes a belt 44 entrained about a pulley 45, secured to an end region of the drive shaft 35, and about a slip clutch-pulley mechanism 46, secured to a support shaft 47 of a paper drive roller 48.

In the interest of simplicity and clarity, all support structure for the drive train, including the frame of the printer, have been omitted herein. For further details of such support structure, as it pertains to a very similar drive train for both the type carrier 16 and the web 41, reference is again made to the Huntoon-Kearney patent.

An inked ribbon 55 is continuously driven selectively in one direction or the other between, and in alignment with, the array of type pallets 18 and the web 41. One preferred embodiment of an improved ribbon spool driving, reversing and tensioning mechanism for use with a printer of the type depicted in FIG. 1 is disclosed in U.S. Pat. 3,825,103, issued July 23, 1974, to A. F. Riley, entitled "High-Speed Printer Having Improved Ribbon Driving, Reversing and Tensioning Mechanism", and also assigned to the assignee of the present invention and incorporated herein by reference.

In the illustrative impact printer embodiment depicted in FIG. 1, the character printing mechanism further comprises both an array of spoke-like impellers 84 (only two shown in FIG. 1), and a plurality of respectively associated impactors, or print hammers, designated generally by the reference numeral 85 (only two shown). There is one impeller and associated hammer for each possible print position, or column, across the width of the web 41, with the spaced impellers 84 being concentrically secured to the longitudinally extending drive shaft 35. Each impeller 84 has a plurality of radially extending, uniformly spaced, spoke-like elements 84a, all of which are oriented in a common plane perpendicular to the axis of the shaft 35. In a preferred embodiment of the printer, the impellers 84 are preferably arranged in a manner as disclosed in a commonly assigned, U.S. Pat. No. 3,795,187, issued Mar. 5, 1974, to E. S. Babler and entitled "Impellers for Impact Printers", herein incorporated by reference.

Each hammer 85 is mounted in a channel (not shown) forming part of the printer frame so as to be selectively driven along a rectilinear path, perpendicular to the web 41, between a normal, untensioned, or non-print position, and a print position whereat an enlarged forward head portion 85a of each hammer is propelled against the backside of the web 22, as described in U.S. Pat. No. 3,823,667, issued July 16, 1974, to E. S. Babler entitled "Force Adjustment in Impact Printers", also incorporated herein by reference. In order to effect line printing, it is apparent that every type character must momentarily be brought into register with every print hammer at some point in time during a print cycle.

The agency through which each impeller 84 drives an aligned hammer 85 against the back side of the web 22 comprises an interponent 92 (only two shown in FIG. 1), preferably supported and actuated in accordance with the disclosure of U.S. Pat. No. 3,822,641 issued July 9, 1974 to E. S. Babler entitled "Impactor Assembly for Printers", herein incorporated by reference. Each of the interponents 92 essentially comprises an elongated upright finger-like member, operably associated with one particular impeller 84 and hammer 85. The interponents are disposed in a lateral array, extending parallel to and respectively aligned with the adjacent free rearward ends 85b of the hammers 85.

Briefly described herein, each interponent 92, in response to a respectively and selectively energized electromagnet assembly 93, and responsively pivoted armature 94, can be positioned in: (1) a first or vertically raised upper position, with its upper free end portion disposed in the path of movement of a then immediately adjacent impeller spoke 84a (for transmitting force from the aligned impeller 84 to an aligned hammer 85), in consequence of which printing occurs; or (2) a second or vertically lowered, non-printing position, in which the upper free end portion of each interponent 92 is displaced from the path of an impeller spoke 84a.

To further facilitate retractable hammer movement, a separate leaf spring 96 is associated with each hammer 85, with the upper end portion of each spring being engaged in a slot which is formed in the underside of the enlarged forward portion of the hammer. The lower end of each leaf spring 96 is secured to frame structure (not shown herein). Each leaf spring 96 is in a relatively unbiased condition when the associated hammer 85 is in its rearward non-printing position, and is in a spring biased condition during printing, when it urges its associated hammer backward, or away from the web 41 to a non-printing position. This cannot occur, however, until after the rearward free end 85b of the hammer has been released by its associated interponent 92. Guidance of each hammer 85 during retractable travel, and the limits of such travel, are controlled in part by means of a horizontal bumper, in the form of a rod 98, which laterally extends through a longitudinally extending slot 99 formed in each of the hammers 85. Opposite ends of the rods 98 are secured to print frame structure (also not shown herein). For further details with respect to the mounting and function of the springs 96 and bumper rod 98, reference is made to the Babler U.S. Pat. No. 3,822,641.

The manner in which the hammers 85 are selectively driven against the web 41, as well as the electronic logic circuitry for controlling such operation, forms no part of the present invention. For further details relating to the cooperating mechanical relationship between the impellers 84, hammers 85, and interponents 92, reference is made to the three copending Babler applications previously cited hereinabove. As for the electromagnet assemblies, they are preferably constructed, arranged, and energized in the manner described in a commonly assigned U.S. Pat. No. 3,785,283, issued Jan. 15, 1974 to J. F. Kearney entitled "Teleprinter Assembly", also incorporated herein by reference. Details as to the manner in which the associated armatures 94 are mounted and pivoted are described in accordance with one preferred embodiment disclosed in U.S. Pat. no. 3,805,695 issued Apr. 23, 1974, to E. S. Babler entitled "Armature Mounting Assembly for a Teleprinter", likewise incorporated herein by reference.

For the purposes of understanding the present invention, and its significance in the illustrative application, it will suffice to simply state at this point that the printer 15, as thus far described, constitutes a line-at-a-time printer, i.e., a plurality of type characters are normally sequentially printed across the width dimension of the web 41 during each of a plurality of sub-scan print periods that occur between successive index advancements of the web. The printing of actual images is accomplished, of course, by each impeller 84 generating, and transferring through the respectively associated and selectively actuated interponent 92, sufficient force against the respectively associated hammer 85 to cause the latter to be driven against the back side of the web 41.

The discrete hammer-propelled areas of the web 41 are then, in turn, driven against correspondingly aligned areas of the aligned inked ribbon 55, and then driven against the particular type characters on the pallets 18 aligned therewith with sufficient force to effect controlled impact character printing on the front side of the web. The required facilities for selectively energizing one or more of the electromagnets 93 during any particular sub-scan is preferably accomplished with the unique hammer control logic circuitry disclosed in the aforementioned Brodrueck patent, which control circuitry is preferably synchronized with the continuously driven endless type carrier 16.

It is with respect to establishing such synchronization, through precise timing pulses generated in response to the actual mechanical movement of the type carrier, that the present invention is concerned and will shortly be described in detail.

In impact printers of the type described hereinabove, at least two critical timing pulse trains are required. One pulse train, often referred to as a "Type Carrier Advance" (TCA) pulse train, synchronizes the logic functions of the hammer firing control circuitry with each new type character print hammer group alignment so as to effect character printing in the proper print columns. A second and slower timing pulse train, often referred to as a "Type Character Reset" (TCR) pulse train, is normally required to identify when the first type character of each font on the carrier is brought into alignment with the first (or some other reference) column of the printer so that the logic control circuitry may be reset to begin a new print cycle.

With respect to the illustrative printer, for example, a character font of 64 characters is employed. As such, it is desired that the pulse generating means produce a first train of 64 timing pulses, with each being representative of a new alignment of type characters on the carrier 16 and respectively aligned print hammers 85 of the printer during a given print cycle. Such a pulse train is represented by the positive pulses depicted in FIG. 9. Such a series of positive pulses thus constitute the aforementioned Type Carrier Advance (TCA) pulse train.

As for the second Type Carrier Reset (TCR) or beginning of font pulse train, it becomes readily apparent that for the impact printer illustrated herein, a precisely defined (TCR) pulse is desired after each successive series of 64 positive (TCA) pulses. In accordance with the principles of the present invention, such a second (TCR) train of timing pulses is advantageously not only produced with a single code wheel and magnetic sensor, but with the second train being readily differentiated from the first train by being of opposite polarity, as represented by the single negative pulse depicted in FIG. 9.

Heretofore, the latter (TCR) timing pulses were often generated by utilizing a so-called flag or finger positioned in the first character slot forming each font on the carrier 16. As such, regardless whether a photoelectric, electro-mechanical or magnetic sensor was employed to detect such a flag on the carrier, it obviously required a separate suitable sensor for that purpose. As previously noted, the need for multiple sensors, (with or without multiple code wheels), in order to generate two or more pulse trains heretofore, disadvantageously has increased the cost of, as well as space requirements for, the magnetic pulse timing apparatus. Moreover, in the case of electromechanical and photoelectric sensors, dust, lint, grease and other foreign matter have had a tendency to impair their effectiveness.

In accordance with the principles of the present invention, the aforementioned problems are resolved with a new and improved mechanically driven, dual-pulse train generating apparatus of the type generally identified by the reference numeral 120 in FIG. 1. With particular reference to FIGS. 2–5, it is seen that the pulse train generating apparatus includes a specially configured code wheel 122, which is coaxially mounted on and secured, such as by a press fit, to a hub of a sleeve 123 which, in turn, is mounted on and secured to one terminating end region of the elongated drive shaft 35.

A plurality of specially contoured magnetic sensor-responsive protuberances 125, made of ferromagnetic material, are equally spaced about the periphery, and preferably formed as an integral part of the code wheel 122. As will presently be seen, protuberances 125 significantly and uniquely define not one, but two pulse train generating code patterns.

A rotatable cam member 128 (best seen in FIGS. 3 and 7) is also coaxially mounted on the drive shaft 35, but supported for differential rotation relative thereto by means of a bushing 129. As best seen in FIG. 7, a continuous cam groove 132, with an asymmetrical region 132', is formed in the side surface of member 128 nearest the code wheel 122.

Interposed between the code wheel 122 and the differentially rotatable cam member 128 is an essentially planar member 135 (best seen in FIGS. 3 and 5) that has an oversized aperture which allows it to be positioned coaxially of the drive shaft 35, but capable of being radially displaced (i.e., displaced perpendicularly relative to the axis of the drive shaft). The intermediate member 135 has two coupling pins 137, 138 which are secured to, and extend outwardly from, one side thereof. These coupling pins are positioned so as to respectively protrude into two diametrically spaced and radially oriented key slots 141 and 142 formed in the code wheel 122. As such, the intermediate member 135 is directly coupled to the code wheel 122 for rotation therewith, even though it is capable of being displaced perpendicularly relative to the axis thereof.

The latter displacement of the intermediate member 135 is effected periodically by cam-action after each successive predetermined number of degrees of angular displacement of the code wheel 122 relative to the rotatable member 124. To produce such cam-action, the intermediate member 135 has a cam follower 145, such as in the form of a pin, secured to and which extends outwardly from, the side of the member 135 opposite the coupling pins 137, 138. As best seen in FIGS. 3 and 7, the cam follower pin 145 communicates with the continuous cam groove 132 formed in the adjacent side surface of the rotatable member 128.

The significance and uniqueness of the code wheel 122 and intermediate member 135, and of the cooperating relationship therebetween, will now be described in greater detail. As best seen in FIG. 5, the illustrative code wheel embodiment has eight of the aforementioned specially contoured protuberances, numbered 125a–h, formed as an integral part of the code wheel and equally spaced along the periphery thereof. Each protuberance is formed so as to have an outer, arcuate peripheral surface 125a', for example, which gradually increases in radii, in the direction of rotation indicated by the arrow in FIG. 5, until terminated by an abrupt, undercut shoulder 125a''.

As such, the series of protuberances 125, in profile, appear very similar to a series of specially contoured peripheral notches in the code wheel 122. The direction and degree of taper of each protuberance, as shown for the indicated direction of rotation of the code wheel 122, effects the generation of a sharp, positive pulse each time the protuberance is passed through, and disrupts, a magnetic field produced immediately in front of a magnetic sensor 155, positioned as best seen in FIGS. 2, 5 and 8. With there being eight protuberances, it is obvious that eight positive pulses will be generated for each complete revolution of the code wheel 122. Thus, eight complete revolutions of the code wheel will effect the generation of the 64 positive (TCA) pulses required for each print cycle in the illustrative printer 15.

The magnetic sensor 155 may be of conventional design, and preferably of the analog type. One such sensor applicable for use with the apparatus of the present invention is designated Model No. 3050, sold by the Electro Corporation, Sarasota, Fla.

The second (TCR) timing pulse train required for the printer illustrated herein, is produced in accordance with one preferred embodiment of the present invention by forming the code wheel protuberance 125h, in part, with a unique, displaceable insert or segment 135'. This segment actually comprises an outwardly extending, fingerlike portion of the previously identified intermediate member 135, and is capable of being displaced from its normal position, as depicted in FIGS. 3 and 5, for example, to its displaced position as depicted in FIGS. 6 and 8B. When the protuberance 125h is passed through the sensor-generated magnetic field, while the segment 135' thereof is displaced, this produces a time-rate-of-change in magnetic flux in such a manner that the sensor generates not only the normal positive output pulse identifiable with the segmented protuberance, but a negative pulse immediately thereafter, as depicted in FIG. 9.

Considered more specifically, with the segmented protuberance 125h in the position depicted in FIGS. 5 and 8A, it is seen that it presents the same discontinuity to the sensor-produced magnetic field as is effected with the other seven protuberances, namely 125a–f. In this case, a positive pulse is always generated whenever any of the protuberances, including the segmented protuberance 125h, passes by the magnetic sensor 155. However, when the segment 135' is displaced inwardly, as depicted in FIGS. 6 and 8B, not only does a leading edge 125h' thereof effect the generation of the normal positive pulse (64 in FIG. 9), but the trailing edge 125h'' effects the generation of a negative pulse (1' in FIG. 9) immediately thereafter, for reasons which will be further explained hereinbelow. The physical displacement of the segment 135' is, of course, effected by the previously described associated cam groove 132, which causes the cam follower pin 145 to displace the intermediate plate 135 radially downward, as viewed in FIGS. 6 and 7.

By rotating the cam groove member 128 seven (or nine) complete revolutions during every eight revolutions of the code wheel 122, the protuberance 125h at such times will not only be positioned immediately adjacent the sensor 155, but only at such times (once for every seven or nine revolutions of member 135) will the segment 135' thereof be cam-actuated downward. As such, the second (TCR) pulse train will be generated as a series of negative pulses, each of which occurs after every series of 64 positive (TCA) pulses, and before the first pulse of the next series of 64 positive pulses.

It will be appreciated, of course, that the rotatable cam groove member 128 could also be rotated at any one of a number of other differential rates relative to the eight revolutions of the code wheel 122 and accomplish the same aforementioned desired results. Taking one extreme case of only one complete revolution of the cam-groove member 128 relative to eight revolutions of the code wheel 122, for example, it becomes apparent that the intermediate cam groove member 135 (and segment 135' thereof) would necessarily be displaced by cam action 8 times during each complete revolution thereof, even though only the eighth displacement of each revolution would be effective in causing the sensor to generate a negative pulse. Such additional and ineffective displacements could produce unnecessary wear of the cam-actuated parts of the pulse generation apparatus.

In order to more fully appreciate the significance of, and the ramifications involved in contouring the ferromagnetic code wheel protuberances 125a–h in the manner embodied herein, and of employing a displaceable protuberance segment of the type illustrated, it would perhaps be beneficial at this time to briefly describe the nature of magnetic sensors, in general. Such sensors advantageously are of the non-contact type, and are capable of sensing a mass of ferromagnetic material which is moved through and momentarily disrupts, or modifies the magnetic flux of the field produced by the sensor. As purchased commercially, magnetic sensors basically consist of an outer shell-like housing, a coil, a pole piece and a permanent magnet. The coil, which is formed of many turns of fine gauge magnetic wire, is wrapped in convoluted fashion around the pole piece. As a result, the pole piece provides a magnetic path for flux from the magnet, through the pole piece, to a region immediately in front of the sensor nose portion whereat it establishes an external magnetic field.

Thus, whenever a ferromagnetic member is moved into and disrupts the sensor-produced magnetic field, the resultant flux change induces an a-c voltage in the coil of the sensor. The amplitude of this voltage signal is approximately proportional to the speed of the ferromagnetic member in passing through the magnetic field, or more specifically, of the time-rate-of-change in magnetic flux sensed by an analog or "passive" magnetic sensor.

In the case of digital or "active" magnetic sensors, they normally have two operating states, an ON state whenever a given time-rate-of-change in flux produces a certain threshold level of circuit voltage, and an OFF state for all voltages below the threshold level. When such a sensor is ON, the induced a-c signal is normally amplified and waveshaped so that the resultant output pulse is of constant amplitude, regardless of code wheel surface speed, as long as the flux-change induced voltage is greater than the threshold level.

In view of the brief description hereinabove of the operating characteristics of magnetic sensors, it can be appreciated that, depending upon the surface configuration of a given ferromagnetic member brought into the magnetic field thereof, different types of singular and plural output pulses, in terms of shape, number, frequency, and polarity may be generated by the sensor. For example, if a plurality of squared-off protuberances in the form of gear teeth were successfully brought into a sensor produced magnetic field, the very abrupt time-rate-of-change produced by the rising and falling edges of each squared-off tooth would produce two equal, but opposite time-rates-of-change in the magnetic flux of the field. As a result, the magnetic sensor would generate two pulses of equal magnitude, but of opposite polarity, respectively representative of the rising and falling edges of the gear tooth.

A "Maltese cross" type of spoked code wheel can produce similar, but more sharply defined, positive and negative pulses alternately for a given direction of rotation of such a code wheel. Likewise, bar-shaped spokes forming a code wheel can produce dual positive and negative pulses alternately, albeit normally not with equal amplitudes and repetition rates. Many other types of code wheels with specially tailored protuberances, in the form of teeth, or spokes, or notches may be employed for diverse pulse generating applications. With respect to pulse train polarity, this is also dependent on the initial North-South pole orientation of the sensor permanent magnet.

From the foregoing, it becomes readily apparent that the magnitude and polarity of magnetic sensor-generated pulses are selectively dependent on four main factors: (1) the peripheral speed of the code wheel (and thus of the ferro-magnetic protuberances passing through the magnetic field), (2) the size and shape of the protuberances, (3) the clearance between the pole piece and the protuberances, and (4) the orientation of the poles of the sensor permanent magnet.

With these factors having a direct effect on magnetic sensor output, it becomes readily apparent that it is the smooth, arcuate peripheral surfaces of the protuberances 125 that effect a time-rate-of-change in magnetic flux that essentially counteracts the effect caused by the peripheral rate of speed of the protuberances in passing therethrough, until the undercut notch areas (or displaced segment) are successively passed therethrough. As a result, the sensor 155 produces an almost zero or negligible output during the time periods that elapse between sensing adjacent protuberance notches, at which times the sharp, spike-like positive (or negative) pulses are generated, as depicted in FIG. 9.

It will be appreciated, of course, that if the code wheel 122 were rotated at the same speed in the opposite direction, the undercut protuberance notches would each effect an opposite time-rate-of-change in magnetic flux. This, in turn, would result in the magnetic sensor 155 generating a train of negative output pulses at the same repetition rate, and with the same magnitude, as depicted in FIG. 9 for the positive pulse train.

It should be noted, however, that code wheel reversals in order to generate two pulse trains of opposite polarity is normally impractical for most timing or measuring applications. This follows from the fact that two such pulse trains would actually be generated alternately and, hence, could never be concurrent or even precisely correlated time-wise. Moreover, it is normally impossible to reverse the rotation of such a code wheel periodically to effect opposite polarity pulses, because it is generally directly coupled to the main drive mechanism of associated apparatus employed to perform some given work function. This, of course, is the situation with respect to the impact printer drive mechanism illustrated herein, wherein the motor 26 drives all of the associated pulleys and shafts either continuously or selectively, but always in the same direction. It has been for this reason also that a separate sensor and code wheel have normally been required heretofore to generate each of several mechanically controlled timing pulse trains of the type of interest herein.

With particular reference again to the present pulse generating embodiment, in order for it to generate 64 positive (TCA) timing pulses for every negative (TCR) timing pulse in the illustrative printer application, the diameters of the various drive and idler pulleys coupled to the motor 26 through the drive belt are chosen so that the magneticially sensed code wheel 122, as previously described, rotates eight complete revolutions for preferably every seven complete revolutions of the differentially rotated cam member 128. A further requirement is that the code wheel 122 initially be angularly oriented relative to the rotatable cam member 128 such that the cam follower pin 145 is located at or very near the center of the asymmetrical cam groove region 132', as depicted in FIG. 7, at the time that the notched portion of the segmented protuberance 125$h$ passes through the magnetic field of the sensor 155.

The necessary differential rotation required between the code wheel 122 and the rotatable cam member 128 of the pulse code generating apparatus is established in the following manner. The elongated drive shaft 35, together with the magnetic code wheel 122 secured thereto, are both driven by the previously identified drive belt 29 and driven pulley 31 (see FIG. 1). Also coupled to the drive belt 29 is an idler pulley 157, secured to a support shaft 158 which is suitably journalled in support structure associated with the frame (not shown) of the printer 15. A second drive belt 161 is coupled both to a recessed pulley-defining area 162 of the differentially rotated cam member 128, and to a drive pulley 163 which is secured to the same shaft 158 that supports the pulley 157. The drive belt 161 is also coupled to a pulley 167 that, for one application of providing forced air circulation, has fan blades 168 formed on or otherwise secured to a side surface thereof. The pulley 167 (including the fan blades 168) is mounted on a rotatable support shaft 171 which is also suitably journalled in support structure associated with the frame (not shown) of the printer 15.

With the foregoing operating conditions and differential rates of rotation satisfied, it has been shown that a single magnetic sensor 155 can advantageously be employed with a single code wheel 122 of the unique type embodied herein, to generate two output pulse trains having different polarities and repetition rates. The need for only one magnetic sensor not only minimizes cost, space and wiring problems, but provides a number of other significant advantages over electromechanical and photo-electric sensors, such as in exhibiting longer life, providing greater operating versatility and reliability under diverse operating conditions, and requiring less maintenance.

In conclusion, it should be fully appreciated from the above description of the invention, that the magnetic sensor-responsive code wheel protuberances 125 disclosed herein could take many other forms to satisfy a given application, such as to effect the generation of not only single, but multiple output pulses, per protuberance, by the magnetic sensor, with such pulses either being of the same or opposite polarity, or both, and effected with or without a change in angular rotation and/or speed of a single code wheel.

It should also be fully understood that there is no particular limit on the number of asymmetrical cam groove regions 132' that may be formed in the cam groove member 128 so as to effect periodic displacement of either a single or multiple segmented protuberances in accordance with the principles of the present invention. Similary, the eight-to-seven ratio of differential angular displacement produced between the code wheel 122 and the associated rotatable cam groove member 128 described herein is merely intended to be illustrative relative to one particular application. It is obvious that any one of a large number of differential ratios could be employed, depending upon such interrelated factors as the number of protuberances and asymmetrical cam groove regions employed.

Similarly it should be appreciated that as the number of segmented protuberances and/or asymmetrical cam groove regions 132' increase, the number of different possible pairs of pulse train outputs increase directly therewith. Indeed, the number and types of pulse train outputs that can be generated with apparatus embodying the principles of the present invention is almost limitless when the differential rates of rotation between the code wheel 122 and the rotatable cam groove member 128, as well as their selected directions of rotation, are taken into account. It should also be realized that the code wheel protuberances need not be formed as an integral part of the code wheel itself, or even be located about the periphery of the code wheel. With respect to the latter possibility, the ferromagnetic protuberances, for example, could also be formed on or otherwise secured to a side surface of the code wheel in a circular array. Finally, the displaceable segment 135' could take many different forms and be displaced in many different ways to effect the generation of a particular type of pulse (or train thereof). For example, the segment 135' could comprise a displaceable insert that would be responsive to either internal or external actuating means. Such means, in addition to comprising cam-actuated apparatus could, for example, comprise magnetic, pneumatic, mechanical or electromagnetic apparatus to effect selective displacement of each segment or insert at the proper times.

In view of the foregoing, it is obvious that various modifications may be made to the present illustrative embodiment of the invention, and that a number of alternatives may be provided without departing from the spirit and scope of the present invention.

What is claimed is:

1. A mechanically driven apparatus for effecting multiple magnetic sensor-generated pulse trains, comprising:

rotatable means adapted for mounting on and rotation with an associated drive shaft, said rotatable means having a plurality of ferromagnetic protuberances spaced in a circular array about the axis thereof, each of said protuberances being contoured so as to result in a sharply defined pulse being generated in response to each successive protuberance being moved at a predetermined speed through and disrupting in a predetermined manner a magnetic field established by a magnetic sensor when positioned adjacent the path of travel of said protuberances, at least one of said protuberances being formed in part by a selectively displaceable segment which, when displaced and upon being moved through a sensor-generated magnetic field, effects the generation of an additional time-related, but distinctive magnetic sensor-generated pulse from the one also effected by said segmented protuberance;

each of said fixed protuberances being formed in the outer periphery of said rotatable means with an arcuate, outwardly tapered peripheral surface that is terminated by an abrupt, under-cut portion so as to form a sharply defined notch, means for displacing said segment after each successive predetermined degree of angular displacement of said rotatable means so that two distinct output pulse trains may be generated by a single magnetic sensor; said displacing means including a rotatable member having an oversized aperture so as to allow the positioning thereof coaxially of a common drive shaft in juxtaposition with said rotatable means, said rotatable member having a finger-like portion extending outwardly thereof to form said protuberance segment;

coupling means for allowing said rotatable member not only to rotate with said rotatable means, but to be perpendicularly displaced relative to the axis thereof; and cam-actuating means associated with said rotatable member for periodically displacing said protuberance segment after each successive predetermined degree of angular displacement of said rotatable means.

2. A mechanically driven apparatus for effecting multiple magnetic sensor-generated pulse trains, comprising:

rotatable means adapted for mounting on and rotation with an associated drive shaft, said rotatable means having a plurality of ferromagnetic protuberances spaced in a circular array about the axis thereof, each of said protuberances being contoured so as to result in a sharply defined pulse being generated in response to each successive protuberance being moved at a predetermined speed through and disrupting in a predetermined manner a magnetic field established by a magnetic sensor when positioned adjacent the path of travel of said protuberances, at least one of said protuberances being formed in part by a selectively displaceable segment which, when displaced and upon being moved through a sensor-generated magnetic field, effects the generation of an additional time-related, but distinctive magnetic sensor-generated pulse from the one also effected by said segmented protuberance;

said rotatable means including a code wheel which has two spaced and radially oriented keyways formed therein, and wherein each of said fixed protuberances is formed in the outer periphery of said code wheel, each of said protuberances having an arcuate, outwardly tapered peripheral surface that is terminated by an abrupt, under-cut portion so as to form a sharply defined notch, and wherein said means for periodically displacing said protuberance segment;

means for displacing said segment after each successive predetermined degree of angular displacement of said rotatable means so that two distinct output pulse trains may be generated by a single magnetic sensor;

a substantially planar member having an over-sized aperture so as to allow the positioning thereof coaxially of a common drive shaft in juxtaposition with said code wheel, said planar member having an essentially perpendicularly extending finger-like portion, the terminating end region of which forms said displaceable protuberance segment, said planar member also having at least two coupling pins secured to the side thereof adjacent said code wheel, and spaced apart so as to be respectively aligned with and received in the keyways of said code wheel, said coupling pins thereby allowing said planar member to be rotated with, but capable of being displaced perpendicularly relative to the axis of, said code wheel, and said planar member further including cam-follower means which allows cam-initiated displacement of said protuberance segment after each successive predetermined degree of angular displacement of said code wheel.

3. In a mechanically driven apparatus in accordance with claim 2, said means for displacing said protuberance segment further including:

a rotatable member adapted for mounting on, but for independent rotation relative to, a common drive shaft associated with said code wheel, and being juxtaposed relative to said planar member, said rotatable member having a continuous cam groove formed therein for receiving said cam follower means, said cam groove including at least one asymmetrical region which is initially angularly positioned relative to said code wheel such that after a predetermined angular displacement of the latter relative to said rotatable member, said asymmetrical cam groove region will cause said cam follower means to radially displace both said planar member and the protuberance segment thereof while moved through a sensor-established magnetic field, thereby causing said modified segmented protuberance to effect not only a normal sensor-generated output pulse, but a timerelated second output pulse which is distinguishable therefrom.

4. In a mechanically driven apparatus in accordance with claim 3, said code wheel and the protuberances thereon are integral and made of ferromagnetic material, and said rotatable member is formed with a peripheral recess for accommodating a drive pulley coupled thereto.

5. A mechanically driven, magnetic-sensor responsive, pulse generating apparatus comprising:

a magnetic sensor capable of generating a distinct output pulse for each predetermined time-rate-of-change discontinuity produced in a magnetic field established thereby;

a rotatable drive shaft;

rotatable means mounted on and secured for rotation with said drive shaft, said rotatable means including a code wheel having a plurality of protuberances equally spaced about the outer periphery thereof, with at least one of said protuberances being formed in part with a displaceable segment, and each of said protuberances, including the segmented one when in its normal configuration, being specially contoured so as to present a first predetermined time-rate-of-change discontinuity in said sensor-established magnetic field, when moved therethrough in a given direction, so as to result in said magnetic sensor producing a first train of output pulses of a given polarity, the repetition rate being dependent on both the number of protuberances and the peripheral speed at which said protuberances pass by said magnetic sensor;

a first rotatable member supported on said drive shaft but adapted for independent rotation relative thereto, said rotatable member having a continuous cam-groove formed in a side surface thereof which is adjacent said code wheel, said cam groove having at least one asymmetrical region;

a second rotatable member interposed between said code wheel and said first rotatable member and positioned coaxially of said drive shaft, said second member having a fingerlike portion extending outwardly therefrom to form said protuberance segment, and further having an oversized aperture and coupling means for allowing it not only to rotate with said code wheel, but to be independently displaced relative to the axis of said drive shaft, said second rotatable member further including cam follower means secured to and extending outwardly from the side of said second member opposite said coupling means, and being positioned so that the terminating end region thereof communicates with said asymmetrical cam groove formed in the adjacent surface of said first rotatable member, the latter initially being angularly displaced and thereafter rotated at a predetermined differential angular rate relative to said code wheel so that after a predetermined degree of displacement therebetween, said cam follower encounters the asymmetrical region of said groove and effects the displacement of said protuberance segment, each such displacement occurring at least during each instant in time when said segment is immediately adjacent said magnetic sensor so as to present a second and different predetermined time-rate-of-change discontinuity in the associated magnetic field, said latter discontinuity effecting a time-related sensor-generated output pulse of opposite polarity from the one normally effected by said segmented protuberance.

6. A mechanically driven, magnetic sensor-responsive, pulse generating apparatus in accordance with claim 5 wherein said protuberances, exclusive of said displaceable segment, are each formed as an integral part of said code wheel, which is made of ferromagnetic material, and wherein first driven pulley means is coupled to and allows said drive shaft, code wheel and second member to be rotatably driven, and wherein second driven pulley means is associated with and allows said first rotatable member to be indpendently driven.

7. A mechanically driven, magnetic sensor-responsive, pulse generating apparatus in accordance with claim 6, wherein said magnetic sensor is of the analog type, and wherein said second pulley driven means includes a pulley-defining recess formed in the periphery of said first rotatable member.

8. A mechanically driven, magnetic sensor-responsive, pulse generating apparatus in accordance with claim 5 wherein said coupling means includes two spaced pins that extend perpendicularly outward from the side of said second rotatable member adjacent said code wheel, and wherein said code wheel has a pair of radially oriented keyways formed in the surface thereof adjacent said second member, said keyways being spaced so as to respectively accommodate the terminating end regions of said coupling pins, and wherein said cam follower comprises at least one pin extending perpendicularly outward from the side of said second member opposite said coupling pins, and positioned so as to communicate with said asymmetrical cam groove formed in said first rotatable member.

9. A mechanically driven, magnetic sensor-responsive, pulse generating apparatus in accordance with claim 8, wherein said protuberances, exclusive of said displaceable segment, are each formed as an integral part of said code wheel, and each configured with an arcuate, outwardly tapered peripheral surface which terminates in an abrupt, notch-forming undercut region, for a preferred direction of rotation of said code wheel, and wherein said first rotatable member has a pulley-defining recess formed in the periphery thereof, which allows the rotation of said first member relative to said drive shaft and code wheel.

10. An improved timing mechanism of the type wherein a plurality of magnetic field-disrupting control members move in sequence past a magnetic sensing head to effect the generation of a stream of normal electrical control pulses synchronized with the movement of the control members, wherein the improvement comprises:

at least one magnetic field-disrupting insert, means for mounting the insert movably with respect to at least one of the control members so that the insert is movable between a first and a second position with respect to the associated control member, the insert and control member being shaped with respect to each other so that, in the first position, only the normal control pulse is generated as the associated control member and insert pass the sensing head, and means for moving the insert to the second position at a predetermined time, the insert and associated control member being further shaped with respect to each other so that, in the second position, a different and distinctive control pulse is generated as the control member and insert pass the sensing head.

11. A mechanism as recited in claim 10, wherein the insert and control member are so shaped that, in the second position of the insert, a leading surface of the associated control member first causes generation of the normal control pulse, after which a discontinuity between the surface of the insert and control member thereafter causes generation of a distinctive control pulse of opposite polarity from the normal control pulses, and which distinctive control pulse occurs at a time between two consecutive normal control pulses.

* * * * *